United States Patent Office 3,508,129
Patented Apr. 21, 1970

3,508,129
ELECTRONIC SYSTEM FOR CORRECTING TRACKING ERRORS
Sydney J. Goldberg, Inglewood, and Raymond H. Griest, Los Angeles, Calif., assignors to Hughes Aircraft Company, Culver City, Calif., a corporation of Delaware
Filed Oct. 21, 1966, Ser. No. 588,459
Int. Cl. G05b 6/02
U.S. Cl. 318—18          9 Claims

ABSTRACT OF THE DISCLOSURE

This invention comprises the combination of a tracking system which provides target displacement errors, such as from a TV tracker and an analog servo system which nullifies these displacement errors within a tracking system servo loop, such as a manually operated anti-aircraft gun or the like.

---

This invention relates to an optical-electronic error signal correction system and more particularly to a novel and improved system for subtracting computed displacement errors in a positioning system.

For the purpose of this specification, tracking will denote the means by which the current values of the angular coordinates of the line-of-sight from an observation point to an object on a trajectory through space are determined. The term electro-optical tracker will be used to denote any device which responds to radiation from the object being tracked by generating electrical signal outputs whose values are a measure of the angular position of the object from two orthogonal reference axes, intersecting the boresight axis of the tracker. Conveniently, such a tracker may take the form of either an infra-red device, of which numerous forms are known in the art, or the gated TV tracker described in the copending application, Ser. No. 583,355 of Chambers et al., filed Sept. 30, 1966 and assigned to the assignee of this invention.

Articles have been published regarding TV tracking systems which may be useful for providing tracking error signals for use with this invention, one of which is "An Automatic TV Tracking Theodolite for Range Instrumentation" authored by Robert E. Wispieff, published in the I.R.E. Transactions on Military Electronics, October 1961. Another article is "Automatic TV Trackers Keep Eye on Missiles" authored by John R. Kruse appearing in the Apr. 6, 1964 issue of Electronics magazine.

A common problem in modern technology is the necessity to track flying bodies accurately despite the very rapid, and perhaps rapidly accelerating, angular motion of the line-of-sight. Specific examples to be discussed in detail hereafter are: tracking an aircraft target by an anti-aircraft weapon system; and illuminating, or ranging upon, an aircraft by means of the very narrow beam of light from a laser. In each example, any error in tracking results in significant degradation in the performance of the associated system.

In order to reduce the magnitude of tracking errors in such systems, in the past it has been necessary to provide large and elaborate mechanical directors controlled by human operators assisted by optical aids and complex manually controlled aided tracking computers and accurate responsive servos. At best, the performance of such directors has left something to be desired; at worst it has been unacceptable. The present invention makes it possible to reduce the tracking errors in the compensated output of the combined electro-optical tracker, and the director upon which it is mounted, to a very small fraction of the best previous performance. Recently, for example, it has been found that it is possible to maintain a laser beam continuously on an aircraft during flight by means of a simple manually operated director incorporating electro-optical compensation and without any mechanical tracking aids whatever. This amounts to a reduction in effective tracking errors over the uncompensated case by a large amount in a device both smaller in size and less expensive than was heretofore possible.

Electro-optical trackers may be constructed to measure tracking errors to fractional mil accuracy throughout a field-of-view of several tens of mils in extent. Also, their response typically can be made faster than that of the human operator. For this reason, the degree of compensation for operator induced tracking errors, and errors from other sources having comparable frequency spectral content can be made quite good. The only requirement is that the target be tracked sufficiently accurately to remain within the field-of-view of the electro-optical unit; a requirement relatively easy to satisfy.

The TV tracking systems which provide the error signal in the tracking system is described in copending U.S. patent application Ser. No. 583,355 of Chambers et al., and assigned to the assignee of the present invention and the aforesaid magazine articles. These TV tracking systems supply two electrical analog error signals $\Delta E$ and $\Delta T$ between the actual position of the target and the optical line-of-sight. These signals are derived from associated electronics which are proportional to the displacement of the target (or TV gates) in train or azimuth (T) and in elevation (E) from a reference electro-optical boresight axis. This invention provides a unique method of utilizing these error signals from the TV camera tracking system to compensate for the tracking errors in the output of the tracking device.

The TV camera is fixed to the tracking device and its boresight reference axes are aligned with those of the tracking device. If, then, the tracking errors can merely be maintained smaller than the field of view of the TV camera, described in the copending patent application of Chambers et al., the output signal of the TV camera will be a measure of the momentary tracking errors, i.e., they will be a measure of the displacement of the line-of-sight to the target from the reference axis of the tracker. By means of the method described in detail later in this application, these tracking error signals may be used to compensate the normal output of the tracking device for its tracking errors in suitable applications. The advantage of this approach is that in these suitable applications, to accomplish an equivalent tracking accuracy by pointing the device mechanically in the manner heretofore employed, if possible at all, would require an expensive, elaborate, massive installation. The cost and complexity of such an installation increases very rapidly to achieve quite moderate reductions in tracking errors. The present invention, on the other hand, permits the use of a relatively small, inexpensive, and light mechanical tracker carrying the TV tracker to perform in some applications in a manner superior to the most elaborate previous equipment even in the case of the laser tracker to the point of substituting a hand-held tracker for a fixed installation.

In one embodiment of the invention which is useful in an anti-aircraft gun system a manually operated director tracks the aircraft and a computer in the director displaces the optical axis of the operator's telescope so as to lead the target properly. The guns are slaved to follow the mechanical axis of the director in azimuth and elevation by a two axis synchronous servo system. Tracking errors result in aiming errors and therefore degrade the probability of hit. In this case, the tracking error correction is applied directly to the output signals of the director by means of separate servo driven differential synchros connected in each output channel between the director and the gun. The angular displacement of the differential synchro is made equal to the tracking error and it serves to displace the slave synchros on the gun by an equal amount, but in the opposite direction. Since in this case, angular error rates also contribute to the system error, the electro-optical tracking error can be differentiated and a corresponding error rate correction signal can also be applied to appropriate terminals in the computer apparatus.

In a second embodiment of this invention which may be useful in a laser beam target illuminator, there is no displacement of the optical axis and no electrical output signal but the actual pointing error must be corrected. In this case, the tracking error is determined as before, but its two corresponding angular components are applied to a servo optical beam pointer, for example, a mirror pivoted about two axes, and driven so as to displace the laser beam with respect ot the optical-mechanical axis of the director by an amount equal and opposite to the tracking error.

It therefore becomes one object of this invention to provide a novel and improved electronic error signal correction system which is adapted to be used with a TV, infra-red, or other electronic tracking system and to utilize the error signals created therein for correcting tracking errors.

Another object of this invention is to provide a novel and improved electronic error correction system which determines the momentary displacement of the tracked object from the optical axis of a director or the like by means of an electro-optical tracker.

Another object of this invention is to provide a novel and improved electronic error correction system for nullifying displacement errors within a tracking system servo loop or the like.

A further object of this invention is to provide a novel and improved electronic error signal correction system which is capable of being attached to and used with present day tracking system now in the field.

A still further object of this invention is to provide a novel and improved error signal correction system in which the tracking system used with the present invention is operable with or without the aid of the present invention.

These and other objects, features and advantages will become apparent to those skilled in the art when taken in consideration with the following detailed descriptions and in connection with the following drawings which:

Figure 1:
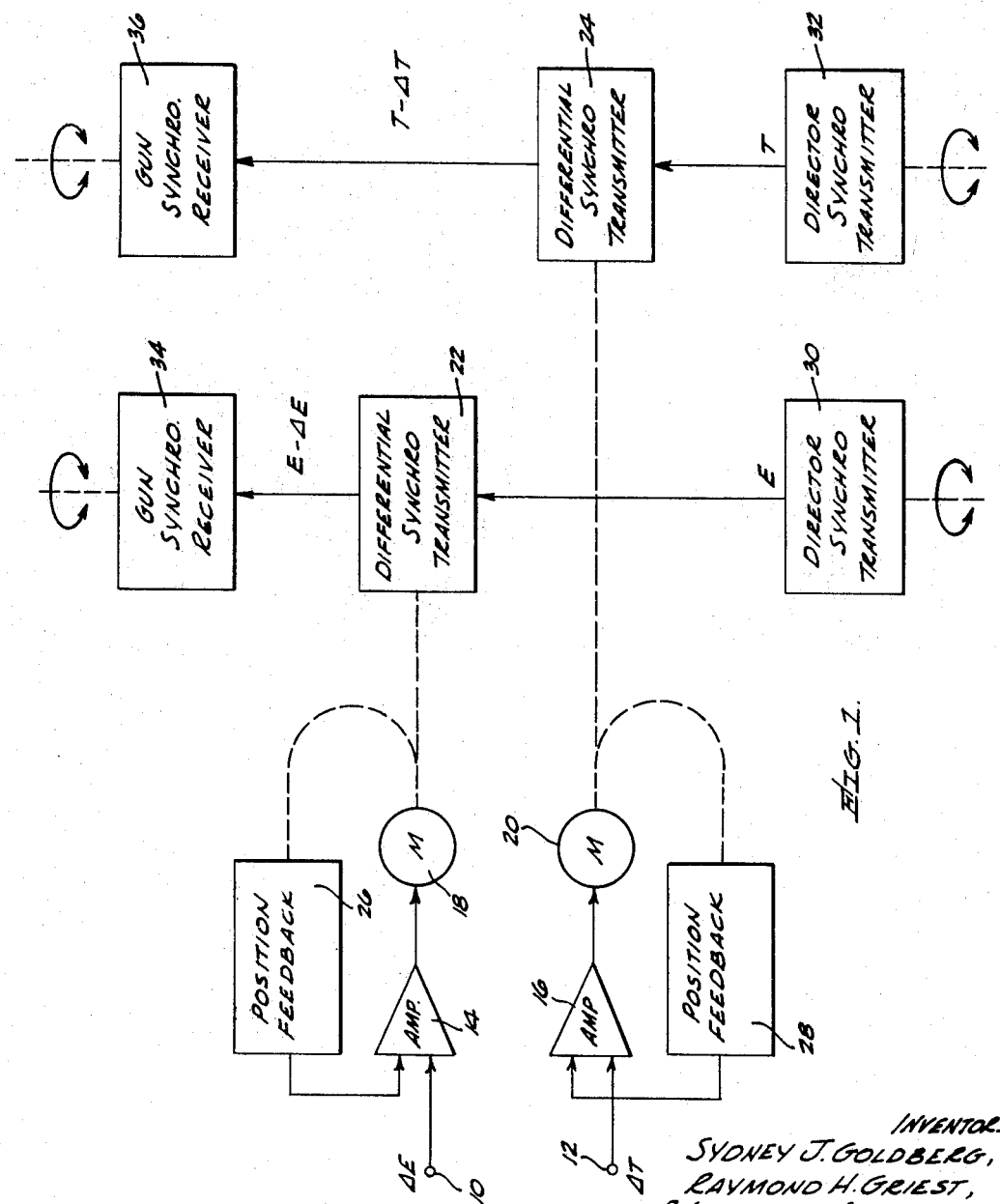
FIGURE 1 is a block diagram of one preferred embodiment of this invention used in connection of a synchronous servo system as an example.

Turning now to more detailed description of one preferred embodiment of this invention there is shown in FIGURE 1 a simplified block diagram of the present invention. A pair of input signals $\Delta E$ and $\Delta T$ are formed by the TV electronics described in the copending application of Chambers et al. (supra), and represent the error signal ($\Delta E$) for example, of the elevation of a tracking medium such as a gun mount and ($\Delta T$) the error signal generated in the train or azimuth of said tracking medium.

The aforesaid error signals are presented to the terminals 10 and 12 which are coupled as input signals to operational servo amplifiers 14 and 16 respectively. The outputs of these amplifiers 14 and 16 are coupled directly into servo motors 18 and 20. Each servo motor is coupled to a differential synchro transmitter 22 and 24. The output shafts of servo motors 18 and 20 are mechanically coupled into position feedback elements 26 and 28 respectively, which provide the negative feedback signals which are summed with the input signals in the servo amplifiers to enable the servo motors to respond accurately and stably to the error signals. The angular position of the output shafts of the motor 18 and 20 thereby provide a continuous mechanical angle analog representation of the error signals applied to the terminals 10 and 12.

The function of the synchro differential transmitters 22 and 24 as herein applied is to respectively receive at their primary terminals the order signals E and T from synchro transmitters 30 and 32, respectively. Each one of the synchro differential transmitters modifies its respective input order signal by an angle equal to the rotor displacement from the electrical zero and thereafter transmits the modified order from its secondary terminals to other synchro units. Each of the synchro differential transmitters 30 and 32 consists of a stator and a rotor inductively coupled and rotatable with respect to each other. The rotor and stator are each provided with a symmetrical three-phase winding. The stator normally receives its magnetizing current from a synchro transmitter and is considered the primary winding.

The structure and operation of differential synchros are well known in the art and will not be further explained herein to conserve space and complexity of this disclosure.

In practice the director and the gun mount thereof operates in a servo loop wherein the elevation (E) and train (T) signals are transmitted by the director synchro transmitters 30 and 32 directly to the gun synchro receives 34 and 36 respectively. These servo loops cause the gun mounts to assume a position parallel to that of the tracker and if there is an error in tracking the target, the servo loops will transmit this error to the gun mounts. By introduction of the present invention into these servo loops the error signal is eliminated. This is accomplished by placing the differential synchros directly into the servo loops by coupling the output shafts of the motors 18 and 20 directly into the rotors (not shown) of the differential synchro transmitters 22 and 24 respectively.

Figure 2:
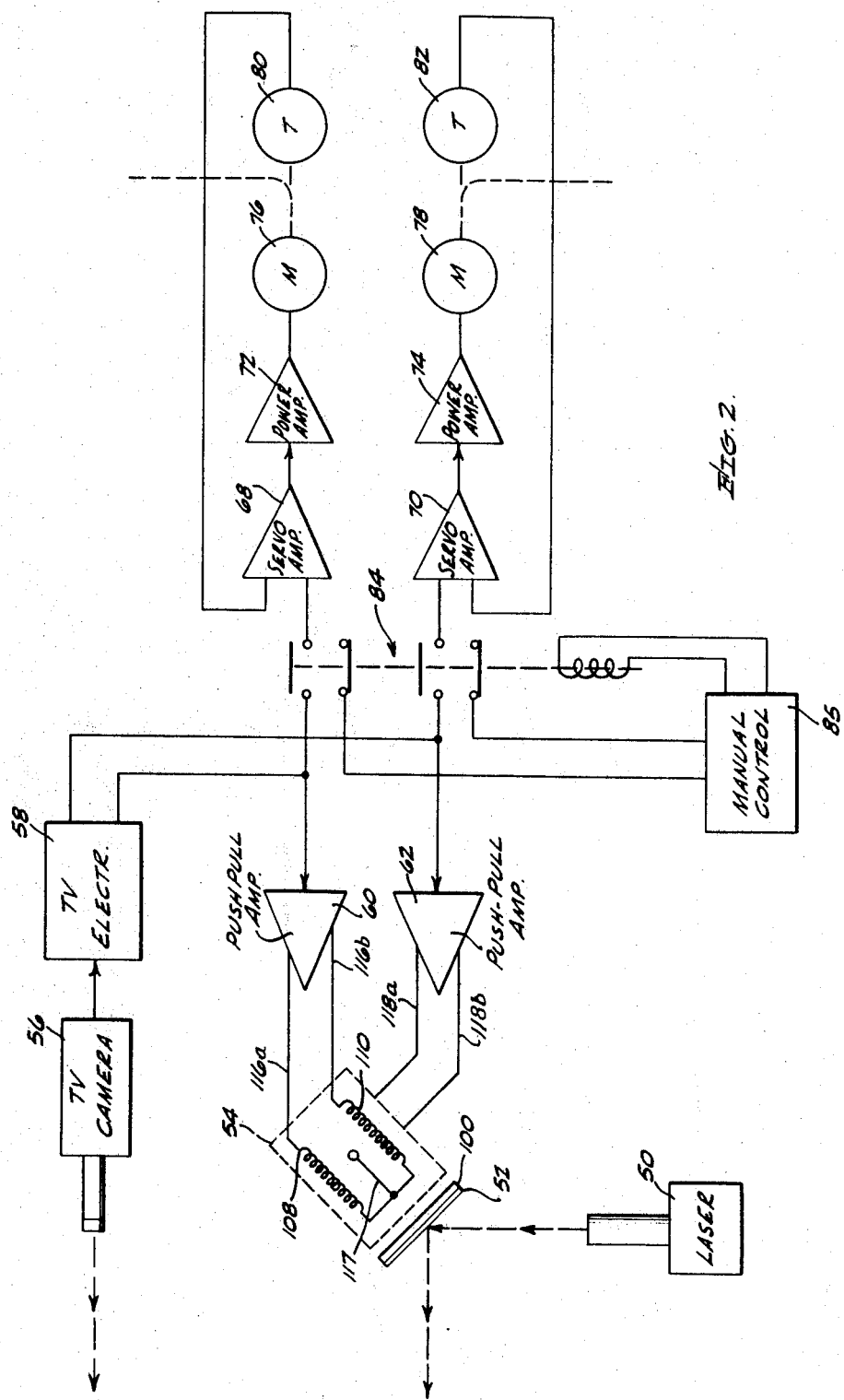
FIGURE 2 is a block diagram of a second preferred embodiment of this invention when used in connection with a laser illuminator as an example.

With reference to the embodiment illustrated in FIGURE 2 there is shown a laser illuminator 50 which reflects its beam from a mirror 52 which is physically attached to a mirror mount torquer 54. The beam is then boresighted with the camera lens of the TV camera 56. The TV camera 56 is coupled to the TV electronics and gating system 58 which provides the outputs of $\Delta T$ and $\Delta E$ as previously described. These error signals are provided to drive the mirror push-pull amplifier 60 and 62 which are physically coupled to the mirror mount torquer 54, which will be described in more detail in connection with FIGURE 3. As the error signals are introduced from the TV camera 56 and the TV electronics and gating system 58, physical movement of the mirror 52 takes place and positively positions the beam from the laser illuminator 50 to reflect the target which can then be used, as an example, for range finding equipment.

The error signals, which drive the amplifiers 60 and 62 to cause the physical movement of the mirror 52, may also be introduced into azimuth and elevation servo trains of the tracker itself if present as well as in those of other associated slaved devices such as gun mounts. The outputs $\Delta T$ and $\Delta E$ are also applied through the pulled down contacts of relay 84, whenever relay 84 is energized by manual control 85, to the inputs of the differential amplifiers 68 and 70, respectively, which provide outputs that are coupled to the power amplifiers 72 and 74 respectively. These power amplifiers 72 and 74 may be, as an example, the well-known mechanical amplidynes for providing power amplification of the output of the differential amplifiers 68 and 70. The outputs of the power amplifiers 72 and 74 provide energizing signals to the electrical motors 76 and 78, respectively, which have their output shafts coupled to the gun servo loops. The output shafts of motors 76 and 78 are coupled into tachometers 80 and 82. The rate signal of these tachometers 80 and 82 are then fed back into the servo amplifiers 68 and 70, respectively, and thereby provide positive damping thereof.

Relay 84 provides for energizing the gun mount from manual control 85 to semi-automatic tracking by the error signals and, again, the operator only need keep the target in the field-of-view of the TV camera 56 for errorless, accurate target tracking of both the laser ranging device and the boresight of the gun mount.

Figure 3:
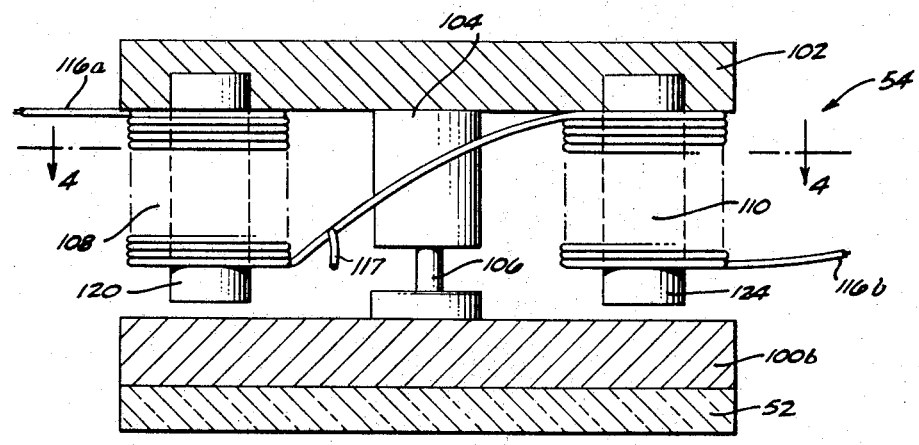
FIGURE 3 is a side view of a typical torquer for physicall movement of the mirror mount used with the embodiment of FIGURE 2.
Figure 4:
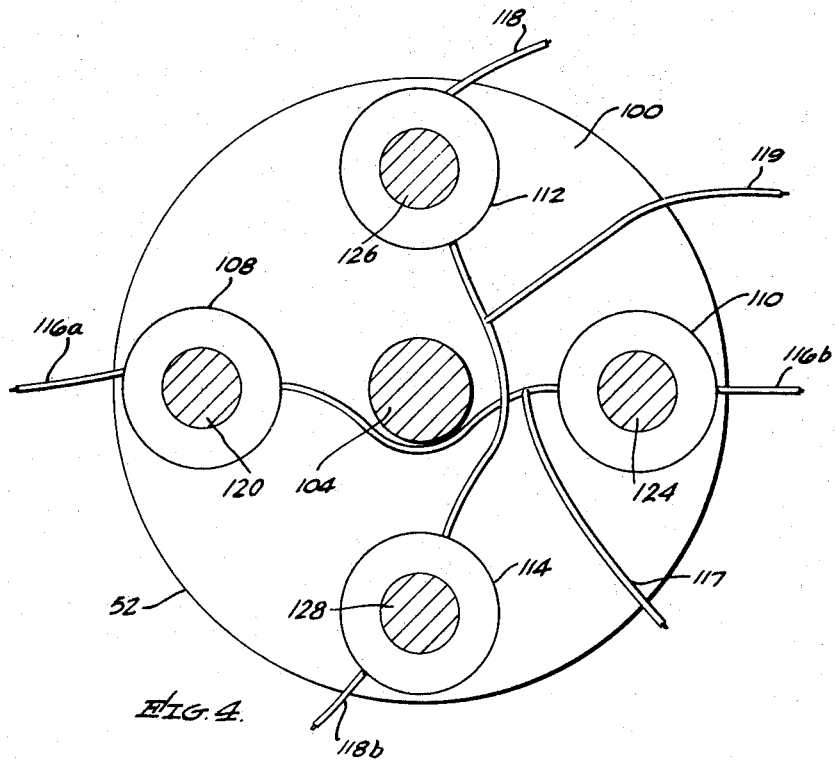
FIGURE 4 is a section view taken along the lines 4—4 of FIGURE 3.

Referring now to FIGURES 3 and 4 which illustrate a typical torquer device 54 which is used for positioning the mirror 52 by the error signal ΔT and ΔE from push-pull amplifiers 60 and 62. The torquer 54 comprises a mirror section 52 which is coupled directly to a metallic soft iron mount 100 by suitable fasteners or by cement bonding. Mount 100 is coupled to a back mount 102 by a post 104 which has a portion of reduced cross section 106 which forms a flexure pivot permitting movement of the mount 100 and mirror 52 about an axis defined by the direction of the net resultant torque applied thereto.

Physical movement of the mirror 52 and mount 100 about pivot 106 is accomplished by four electro-magnetic coils 108, 110, 112, and 114 about the pole pieces 120, 124, 126 and 128, respectively. These electro-magnetic coils are arranged in pairs about the pivot 106 so that each pair develops a torque on the mirror mount 100 about one tracking axis. This torque is proportional to the difference in the currents flowing in the two coils.

The coils 108 and 110, for example, form one such pair connected to the push-pull amplifier 60 by the wires 116a and 116b and to a common return 117, as shown in FIGURES 2, 3 and 4. Similarly coils 112 and 114 form a second pair and are connected to the push-pull amplifier 62 by the wires 118a and 118b and to a common return 119, as shown in FIGURES 2 and 4.

The push-pull amplifier 60 respectively develops in the wires 116a and 116b two output currents whose values differ in magnitude and direction in accordance with the corresponding tracking error signal applied thereto. The flow of these output currents through the electro-magnetic coils 108 and 110 develops a corresponding net torque on the mirror mount 100 which results in a corresponding deflection of the mirror 52 about the corresponding tracking axis due to the elastic reaction of flexure pivot 106. The push-pull amplifier 62 and coils 112 and 114 operate in a similar manner about the other tracking axis. The gain of each amplifier is then adjusted to be in proper relation to the restoring movement of the pivot of flexure post 104 so as to make the angular deflection of the mirror one-half the angular tracking error, measured by the TV system 58 about the corresponding axis. By the well-known law of the reflection of light from a mirror, this will compensate completely for the corresponding tracking error. In this implementation the deflection of the mirror 52 is not controlled by a position or rate feedback connection, and therefore it is not independent of variations in the gain of the amplifiers 60 or 62 or of the elastic compliance of the flexure post 104.

The target can thus be illuminated by the laser 50 and tracked by the TV camera 56 with the error between the actual target and the sighting of the tracking member such as a gun mount or the like corrected within the servo loop by the same system which corrected the illuminator beam error.

It should be understood, of course, that the preceding specification only illustrates two preferred embodiments of this invention and that many modifications can be made, such as substituting the method of displacing the mirror with gimballed mounts or by actually introducing the error corrections into the gyro torquers of the gun mounts, without departing from the spirit and scope of this invention.

Having thus described one embodiment of this invention what is claimed is:

1. A system for correcting the tracking errors of a two-coordinate axes tracking system by respectively introducing azimuth and elevation error correction signals into the tracking system, comprising:
   electro-optical means for providing the tracking errors in each of the two axes of the tracking system;
   displacement means coupled to said electro-optical means and being responsive to the tracking errors from the two axes for generating angular displacements proportional to the respective tracking errors; and
   correction means coupled to said displacement means for introducing the angular displacements provided by said displacement means into the tracking system in order to correct the tracking errors in the two axes.

2. The system of claim 1 wherein said electro-optical means comprises a TV tracker which responds to radiation from an object being tracked by generating electrical signal outputs whose values are a measure of the angular position of the object from two orthogonal reference axes which intersect the boresight axes of the tracker.

3. The system of claim 1 wherein:
   said displacement means includes first positioning means for providing the angular displacement proportional to the tracking error in one axis of the two coordinate axes, and second positioning means for providing the angular displacement proportional to the tracking error in the other axis of the two coordinate axes; and
   said correction means includes a first correction device for introducing the angular displacement from said first positioning means into one of the coordinate axes of the tracking system, and a second correction device for introducing the angular displacement from said second positioning means into the other of the coordinate axes.

4. The system of claim 3 wherein:
   each of said first and second correction devices is comprised of a differential synchro transmitter having an input shaft positionable by a corresponding one of said first and second positioning means and having an output path coupled to a respective servo loop for one of the axes of the tracking system.

5. The system of claim 4 wherein each of said positioning means comprises:
   summing means having an output, a tracking error signal input and a feedback signal input, said summing means being responsive to signals applied to said tracking error signal input and said feedback signal input for producing the error correction signal for a corresponding axis of the two coordinate axes tracking system;
   an electric motor having an input circuit coupled to the output of said summing means and an output shaft coupled to said input shaft of the corresponding one of said differential synchro transmitters, said motor being responsive to the error correction signal from said corresponding summing means for causing its output shaft to be angularly displaced in proportion to the tracking error in the corresponding axis; and
   feedback means coupled between said output shaft of said motor and said feedback input of said summing means for providing a feedback signal to said feedback signal input of said summing means.

6. The system of claim 5 wherein:
   said summing means is a summing amplifier which algebraically sums the feedback signal with the tracking error signal to provide the output error correction signal to drive said electric motor, said summing means producing a voltage null at said output thereof when the angular displacement of said output shaft of said electric motor is proportional to the amplitude of the tracking error applied to said tracking error input.

7. The system of claim 2 wherein said displacement means comprises:
 first amplifier means responsive to a tracking error signal in one axis for producing an angular displacement in the first axis; and
 second amplifier means responsive to the tracking error in the second axis for causing an angular displacement in the second axis.

8. The system of claim 7 wherein said correction means comprises illuminating means for providing an illuminating beam, said illuminating means including a reflective device being positionable about the two axes in response to the error signals provided by said electro-optical means so that the reflective device is always positioned so that the illuminating beam is on a selected target.

9. The system of claim 7 wherein:
 each of said first and second amplifier means is a push-pull amplifier circuit having tapped opposing outputs across which a resultant electromagnetic force is developed and applied to said illuminating means to cause said reflective device to be positioned in a corresponding axis.

References Cited
UNITED STATES PATENTS

| | | | |
|---|---|---|---|
| 2,182,717 | 12/1939 | Chance | 318—31 |
| 2,182,696 | 12/1939 | Janeway | 318—31 |
| 2,307,134 | 1/1943 | Johnson | 318—18 |
| 2,718,061 | 9/1955 | Omberg et al. | 318—24 XR |
| 2,989,672 | 6/1961 | Agins | 318—19 |
| 3,122,687 | 2/1964 | Romvari | 318—28 |
| 3,188,541 | 6/1965 | Eisengrein et al. | 318—30 XR |
| 3,388,314 | 6/1968 | Gould | 219—121 |

BENJAMIN DOBECK, Primary Examiner

U.S. Cl. X.R.

318—28